I. W. P. BUCHANAN

May 2, 1933. COMPRESSION SPRAY GUN Re. 18,813

2 Sheets-Sheet 1

Original Filed April 12, 1929

I. W. P. Buchanan
INVENTOR

BY Victor J. Evans
ATTORNEY

May 2, 1933.
I. W. P. BUCHANAN
COMPRESSION SPRAY GUN
Re. 18,813
2 Sheets-Sheet 2
Original Filed April 12, 1929
Fig. 2.
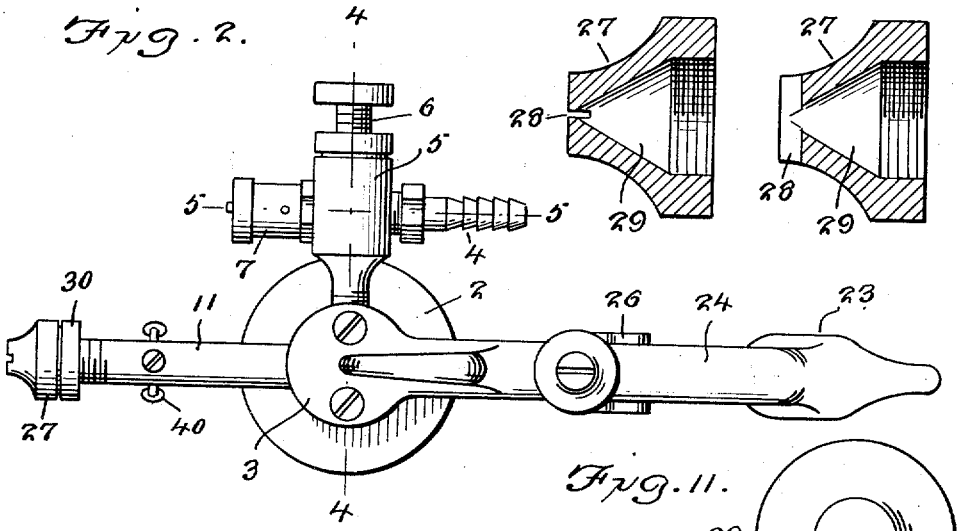
Fig. 9.
Fig. 10.
Fig. 11.
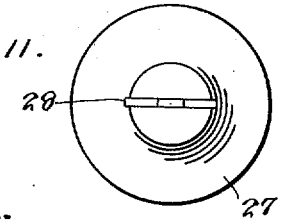
Fig. 4.
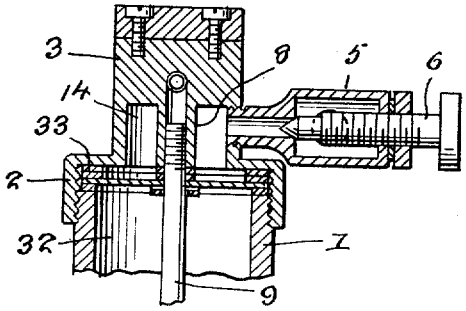
Fig. 5.
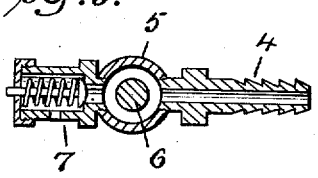
Fig. 6.
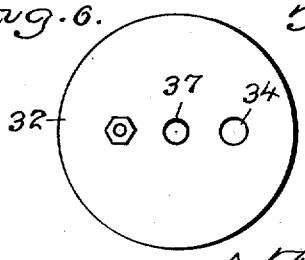
Fig. 7.
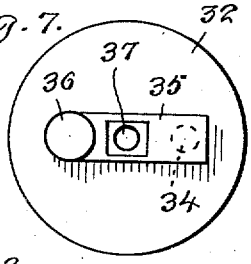
Fig. 8.
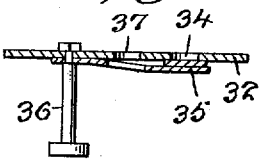
Fig. 12.
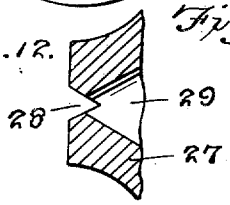
Fig. 13.
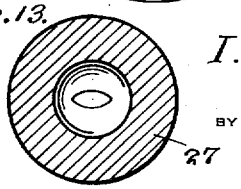
I. W. P. Buchanan
INVENTOR
BY Victor J. Evans
ATTORNEY Reissued May 2, 1933 Re. 18,813

UNITED STATES PATENT OFFICE

ISAAC W. P. BUCHANAN, OF LEBANON, TENNESSEE

COMPRESSION SPRAY GUN

Original No. 1,744,208, dated January 21, 1930, Serial No. 354,668, filed April 12, 1929. Application for reissue filed September 22, 1931. Serial No. 564,703.

This invention relates to a compression spray device or gun, the present invention being an improvement over that forming the subject matter of an application filed by me on February 15, 1928, Serial No. 254,510, the general object of the invention being to provide means whereby the liquid is ejected by pressure as well as suction so that the device will operate with the minimum amount of compressed air, this air being used to create pressure in the container above the liquid therein and also used to create suction in the liquid tube and to act on the air escaping from the tube to create a spray. This compression structure, although applying swaths decidedly wider than the suction structures now on the market, requires approximately one-third of the compressed air used by them. This fact allows an outfit of compressor plant and gun, weighing approximately fifty pounds, as against from four to ten times this weight of plants now being marketed, and which last are only capable of inferior functioning. Also in addition to this first-time-accomplished portability, only a ½ H. P. motor is required, which can be attached, without danger, to any electric light lamp socket.

A further object of the invention is to provide a tip having a slot therein for producing a fan-shaped spray and to so form the tip and its slot that the central portion of the fan-shaped spray will be thicker than the end portions or edges of the spray, so that the swaths of paint or the like, sprayed on a surface by the device, can be made to overlap without the laps being thicker than the other portions and without causing runs.

As will be seen, the interior walls of the tip terminate in the slit, and so converge as to produce a fan shaped spray of fixed flare limits.

The object of my slitted tip is to produce a fan shaped spray and which so co-acts with the adjustable liquid control valve as to produce fan shaped sprays varying in width between one-half inch and sixteen inches, or more.

A further object of the invention is to provide an adjustable mixing chamber, with stabilizing means for producing a homogeneous cross section of a fan-shaped spray, this mixing chamber permitting the air and liquid to intermingle under pressure before escaping from the tip, thus producing a fan-shaped spray of uniform cross section and allowing the fan shaped spray to be arranged either vertically or horizontally.

A further object of the invention is to provide adjustable means for restricting the flow of air after it has contacted the liquid. Its function is to increase the volume of liquid to be atomized. This means is especially desirable in connection with large stationary containers—in which last case the needle valve 6, Figure 2, can be used.

Another object of the invention is to provide a disk carrying a valve, the disk being located between the container and the atomization head and acts to prevent the liquid in the container from entering the head, while permitting air to enter the container from the head to place the contents thereof under pressure. This disk, of course, could be integral with atomizing head.

Another object of the invention is to provide a pressure control valve for closing the air supply line to the container so that the container can be removed and filled without stopping the power plant that supplies compressed air to the device.

A still further object of the invention is to provide adjusting screws in the eduction tube for centering the liquid tube in the eduction tube.

Another object of the invention is to provide a manually operated valve interrupting the flow of liquid through the liquid tube without interfering with the air flow, so that the spraying can be stopped instantly and then when the valve is opened to permit the liquid to flow again, the same texture of atomization is produced as was produced before the valve was closed, with simple means for adjusting said valve so as to control the fineness and volume of spray.

The adjustable liquid valve for starting and stopping the flow of liquid, also gauges the amount of liquid delivered at each trigger operation.

This adjustment allows this valve to co-act with the slitted tip so as to produce fan-shaped sprays varying in width from one-half inch to sixteen inches or more.

Large quantities of liquid entirely fill out the fixed air contour of the fan-shaped spray, and smaller quantities of liquid fill the center, only, of this fixed air contour.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a top plan view.

Figure 4 is a section on line 4—4 of Figure 2.

Figure 5 is a section on line 5—5 of Figure 2.

Figures 6 and 7 are views of the valve carrying disk.

Figure 8 is a longitudinal sectional view through said disk.

Figures 9, 10, 11, 12 and 13 are views of the tip.

Figure 1:
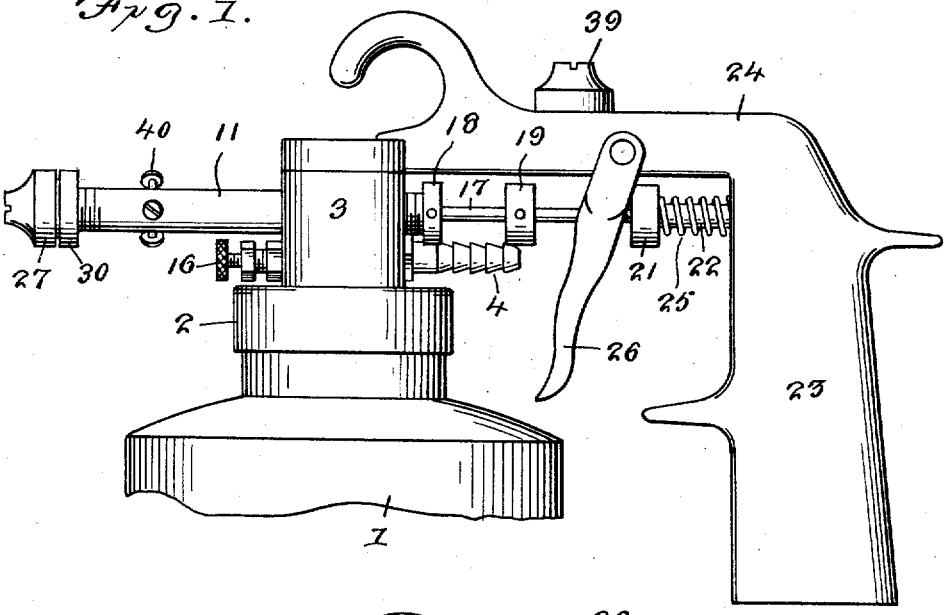
Figure 1 is an elevation of the invention.

In these drawings, the numeral 1 indicates a container, the neck of which is threaded to receive a cap 2, the cap being provided with a hollow dome 3 into which air is introduced from a suitable source of supply through a tube connected with the inlet member 4, which in turn is connected with a valve casing 5, one end of which is threaded in a hole in the dome. This member carries the needle valve 6, the closing of which prevents air from entering the dome. The valve casing 5 also carries a safety valve 7 for preventing damage to the parts by excessive pressure.

A depending tubular part 8 is formed at the center of the dome and a section 9 of a liquid tube is threaded into the depending portion, the lower end of the section extending to a point adjacent the lower end of the container. The other section 10 of the liquid tube is threaded into a horizontal opening formed in the upper end of the depending part so that liquid can pass from the section 9 through the tubular part 8 into the section 10, it being seen that the section 10 extends horizontally and at right angles to the section 9. An eduction tube 11 surrounds the section 10 of the liquid tube and has one end threaded into an opening 12 formed in one side of the dome and an air tube 13 connects the inner end of the opening 12 with the lower part of the chamber 14 formed by the hollow dome so that air can pass from the chamber 14 through the tube 13 into the eduction tube. As will be seen, the section 10 of the liquid tube passes through the opening 12 and is not in communication therewith.

The air tube 13 is provided with an opening 15 which is controlled by a set screw valve 16 threaded through a packing gland 16′ in the dome, so that by adjusting the set screw valve, the escape of air into the eduction tube can be regulated. This arrangement permits the air passing to the eduction tube to be regulated from the exterior of the dome and while the device is in operation.

Figure 3:
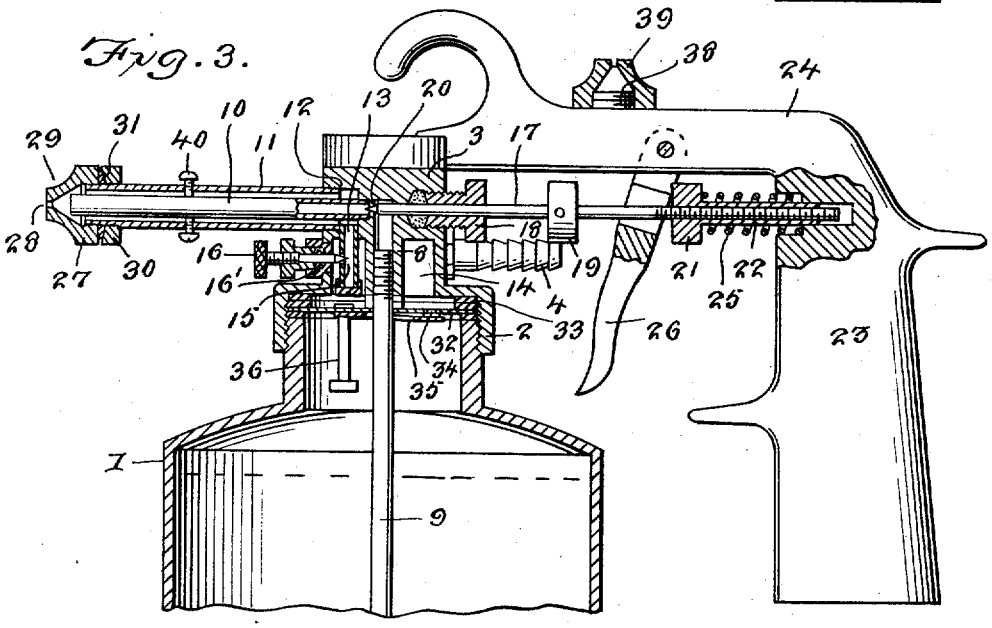
Figure 3 is a vertical sectional view, with parts in elevation.

It will, of course, be understood that after the valve 16 is adjusted, the same amount of air will always be passing to the eduction tube, since the compressor is delivering the same amount of compressed air to the dome, and all of this air will pass through the tube 13 to the eduction tube. By adjusting the valve 16, the passage of the air to the eduction tube is more or less restricted, and therefore causes more or less pressure on the liquid in the container. It is also observable in Figure 3 that by adjusting the tip 27, very near the end of the liquid tube 10, the same kind of air-passage restriction would result.

The flow of liquid into the section 10 of the liquid tube is controlled by a needle valve 17 passing through a packing gland 18 in the head, with its pointed end engaging a seat 20 against which the inner end of the section 10 abuts. The outer end of the needle valve is threaded in the head 21 of a tubular stem 22 which is slidably arranged in the upper part of the handle 23 of the device, this handle having a horizontal part 24 at its upper end which is bolted or otherwise secured to the top of the dome. A knurled member 19 is fastened to the stem of the needle valve to facilitate turning of the same. A coil spring 25 is arranged on the stem 22 and bears against a part of the handle and head 21 and acts to hold the needle valve on its seat 20. A trigger 26 has its upper forked end pivoted to the part 24 of the handle, a portion of the trigger engaging the head 21 so that when the trigger is moved rearwardly by one or more of the fingers of the hand grasping the handle 23, the needle valve will be moved to open position.

A tip 27 is threaded on the outer end of the eduction tube so that it can be adjusted toward and away from the end of the section 10 of the liquid tube which protrudes from the eduction tube. This tip is formed with a slot 28 and with a conical interior part 29 and at the point where the slot enters the chamber formed by the conical part, a substantially elliptical opening is formed for the escape of the mixture of air and liquid so that a fan-shaped spray is produced, the center of which is of greater thickness than the ends or edges. The chamber formed by the conical part 29 provides a mixing chamber wherein the liquid passing from the section 10 of the liquid tube and the air passing from the eduction tube can intermingle before the mixture escapes from the split in the tip. The tip is locked in adjusted position by the nut 30 which is threaded on the eduction tube and the gasket 31 which is placed between the nut and the rear end of the tip. By making the tip or nozzle adjustable, the slot therein can be placed in either a horizontal or vertical position, so that the spray will pass from the nozzle in either a horizontal or vertical position.

While the drawings show the section 10 of the liquid tube passing entirely through the eduction tube, I find that this section 10 can be greatly shortened or even omitted without interfering with the operation of the device.

A disk 32 is placed between the neck of the container and the cap, gaskets 33 being placed between the disk and the cap and between the disk and the neck of the container to make a liquid and airtight junction at this point, said disk being formed with an opening 34 therein which is closed by a flap valve 35 opening downwardly so that air can enter the container from the dome, but liquid cannot pass from the container into the dome. A handle 36 is connected with the disk to facilitate its removal. The section 9 of the liquid tube passes snugly through a hole 37 formed in the center of the disk.

A threaded projection 38 is formed on the top of the part 24 of the handle and is designed to receive an extra tip 39 which may be substituted for the tip 27, the tips being of different sizes. Of course, more than one projection 38 can be placed on the part 24 to receive other tips.

From the foregoing it will be seen that when the inlet member 14 is connected by a hose to a source of compressed air and the valve 6 opened, the air will enter the chamber 14 formed by the hollow dome and some of this air will pass through the valve covered opening in the disk 32 into the container and thus place the contents of the container under pressure. This will tend to force the liquid in the container through the section 9 of the liquid tube, but the liquid is prevented from passing into the section 10 by the needle valve 17. Some of the air in the chamber 14 will pass through the tube 13 into the eduction tube so that when the trigger 26 is operated to open the valve 17, the liquid will flow through the sections of the liquid tube into the mixing chamber in the nozzle or tip, where it will be mixed with the air passing from the eduction tube, this air passing from the eduction tube also creating a suction in the liquid tube so that the liquid is ejected both by pressure and by suction. The mixture of air and liquid passing through the slot 28 will take the form of a fan-shaped spray and due to the elliptical shape of the opening, the spray will be of greater thickness at the center than at its ends or edges, so that the swath of paint or other material being sprayed on a surface can be overlapped without unduly thickening the overlapping portions and without producing "runs" at said portions.

If the swath is not uniform, the tip should be adjusted until the swath is uniform.

This tip, with the adjustable mixing chamber formed by the tip and the outer end of the eduction tube, will produce fan-shaped sprays up to twenty inches in width at the ordinary distance of application, and attention is called to the fact that while the adjustable mixing chamber is apparently like the atomizing feature of my hand spray, patented May 15, 1928, No. 1,670,235, is is not only entirely different in its function, but it is for an entirely different purpose. In said hand sprayer, since the hole in the tip is very small, the air cannot escape as rapidly as it is supplied and the consequence is that there is a greater or smaller pressure exerted on the liquid emerging from the liquid tube, and this liquid is therefore allowed to mix with smaller or larger quantities of air, thus producing variable atomizations. The mixing chamber in this application, however, does not allow air to back up and decrease the emerging liquid, as the long slit in the tip permits the air to escape.

As will be understood, when a large quantity of liquid is forced through the nozzle or tip, the swath will be of the maximum width, but when the quantity of liquid is decreased by the adjustment of the needle valve, the width of the swath is reduced as the liquid passes from the central part of the slit and nothing but air passes from the ends of the slit, as the air envelopes the reduced quantity of liquid and thus this reduced quantity of liquid forms a fan shaped spray of smaller width.

Thus the peculiar form of nozzle, co-acting with the adjustable liquid valve, enables the device to produce fan shaped sprays of varying widths.

The valve disk 32 permits air to enter the container and prevents liquid from reaching the head and it will prevent the gun from spraying through the air tube 13 when the gun is tilted more than usual.

The pressure control valve 6 can be closed without stopping the power plant so that the container can be refilled or changed.

The section 10 of the liquid tube is centered in the eduction tube by three small screws 40 and by adjusting the needle valve 17 in the head 21, the amount of liquid passing through the liquid tube can be controlled or regulated when the valve is open.

This device, while adapted to agricultural and horticultural needs, is mainly intended for the spray application of paints and lacquers and can be used with a minimum amount of compressed air and as it is of small weight, it can be easily carried from place to place. As but a small power plant is necessary to furnish the air, the motor of the plant can be used with the ordinary house current. The texture of atomization is from the faintest tint to any desired degree of coarseness.

Therefore, we have a portable and an electric lamp socket attachable plant doing much faster work than competing plants that are neither portable nor capable of being attached, for their power, to ordinary electric light sockets.

The slit in the tip may be formed by a straight slot, as shown in Figures 9, 10 and 11, though it is preferable to form it by a V-shaped slot, as shown in Figures 12 and 13.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A compression spray gun for use with a supply of air under pressure, comprising a liquid container, means for introducing compressed air into the container to place liquid therein under pressure, an induction tube associated with the container and through which some of the compressed air passes, adjustable means for restricting the escape of air from the container into the induction tube after it contacts the liquid, a nozzle mounted on the eduction tube a liquid tube connecting the interior of the container with the space enclosed by the nozzle and eduction tube, and valve means associated with the liquid tube for starting, stopping, and operatively controlling the flow of liquid therethrough without interrupting the flow of air through the eduction tube.

2. A power spray gun comprising a hollow head, a container detachably connected therewith, means for introducing compressed air into the head, an eduction tube connected with the head and in communication with the interior thereof, a nozzle having an elongated slit therein associated with the outer end of the eduction tube, a liquid tube carried by the head and connecting the interior of the container with the space enclosed by the nozzle and eduction tube, adjustable means for restricting the escape of air from the container into the induction tube after it contacts liquid, a hand operated valve for controlling the flow of liquid through the liquid tube, means for adjusting the valve.

3. A power spray gun comprising a hollow head, a container detachably connected therewith, means for introducing compressed air into the head, an eduction tube connected with the head and in communication with the interior thereof a nozzle having an elongated slit therein adjustably connected with the outer end of the eduction tube, a liquid tube carried by the head and connecting the interior of the container with the space enclosed by the nozzle and eduction tube, adjustable means for restricting the escape of air from the container into the eduction tube after it contacts liquid, a hand operated valve for controlling the flow of liquid through the liquid tube, means for adjusting the valve, a partition placed between the head and container and having a controlled opening therein whereby air can pass from the head into the container but liquid is prevented from passing from the container into the head.

4. A power spray gun comprising a hollow head, a container detachably connected therewith, an angle-shaped handle connected with the head, means for introducing compressed air into the head, some of this air entering the container for placing liquid therein under pressure, an eduction tube connected with the head and in communication therewith, an adjustable nozzle on the outer end of the eduction tube having an elongated slit therein forming a fan-shaped spray, adjustable means for restricting the escape of air from the container into the eduction tube after contacting the liquid in said container, a liquid tube carried by the head and connecting the interior of the container with the space enclosed by the nozzle and eduction tube, a needle valve stem passing through the head and when in closed position preventing the flow of liquid through the liquid tube, means for adjustably connecting the needle valve stem to a trigger pivoted to the handle, whereby the valve will be unseated when the trigger member is operated, and without interrupting the flow of air through the eduction tube.

5. A power spray gun comprising a hollow head, a container detachably connected therewith, an angle-shaped handle connected with the head, means for introducing compressed air into the head, some of this air entering the container for placing liquid therein under pressure, an eduction tube connected with the head and in communication therewith, an adjustable nozzle on the outer end of the eduction tube having an elongated slit therein forming a fan-shaped spray, adjustable means for restricting the escape of air from the container into the eduction tube after contacting liquid in said container, a liquid tube carried by the head and connecting the interior of the container with the space enclosed by the nozzle and eduction tube, a needle valve passing through the head and when in closed position preventing the flow of liquid through the liquid tube, a spring pressed slidable member associated with the handle, means for adjustably connecting the needle valve to said member, a trigger pivoted to the handle and engaging a part of the slidable member whereby the valve will be unseated when the trigger member is moved toward the handle, a valve carried by the head for closing communication between the head and the air supply, a safety valve associated with the head, and means for centering the liquid tube in the eduction tube.

6. A spraying device comprising a container, a cap therefor, a hollow head mounted on the cap and having a space in communication with the container, an eduction tube mounted in the head and in communication with the interior of the head, a liquid tube means carried by the head and having a part extending into the container and another part extending into the eduction tube, a source of compressed air feeding into the hollow head, a partition separating the air space of the hollow head from the container and having an opening therein, means for controlling the opening whereby air can pass from the head into the container to force liquid therein to the eduction tube and whereby liquid is prevented from passing from the container into the head, and means for causing air passing through the eduction tube to act on the liquid emerging from the liquid tube, comprising a nozzle on the fore end of the eduction tube.

7. A spraying device comprising a container, a cap therefor, a hollow head mounted on the cap and having a space in communication with the container, an eduction tube mounted in the head and in communication with the interior of the head, a liquid tube means carried by the head and having a part extending into the container and another part extending into the eduction tube, a source of compressed air feeding into the hollow head, a partition separating the air space of the hollow head from the container and having an opening therein, means for controlling the opening whereby air can pass from the head into the container to force liquid therein to the eduction tube and whereby liquid is prevented from passing from the container into the head, and means for causing the air passing through the eduction tube to act on the liquid emerging from the liquid tube, comprising a nozzle on the fore end of the eduction tube, said nozzle having an elongated slit therein to produce a fan-shaped spray.

8. A compression power gun for producing a fan-shaped spray, comprising a liquid container, a means for introducing compressed air into the container, an eduction tube associated with the container and through which the compressed air passes, a slitted nozzle mounted on the eduction tube, having its interior walls terminating in the slit and so converging as to limit the flare of the fan-shaped spray, a liquid tube connecting the interior of the eduction tube with the container, a valve for controlling the flow of liquid through the liquid tube, whereby the flow of liquid is started and stopped, and means for adjusting the valve to regulate the quantity of liquid passing through the nozzle, whereby the valve co-acts with the nozzle for producing fan-shaped sprays of varying widths.

9. A compression power gun for producing a fan-shaped spray, comprising a liquid container, a means for introducing compressed air into the container, an eduction tube associated with the container and through which the compressed air passes, a nozzle having an elongated slit therein, and associated with the outer end of the eduction tube, a liquid tube means having a part extending into the container and another part extending into the eduction tube, a valve for controlling the flow of liquid through the liquid tube without interrupting the flow of air through the eduction tube, whereby the flow of liquid is started and stopped, and means for adjusting the valve to regulate the quantity of liquid passing through the nozzle, whereby the valve co-acts with the nozzle for producing fan-shaped sprays of varying widths.

ISAAC W. P. BUCHANAN.